United States Patent
Mizumura et al.

(10) Patent No.: US 6,937,296 B2
(45) Date of Patent: Aug. 30, 2005

(54) FLAT PANEL DISPLAY UNIT AND METHOD OF REPAIRING DEFECTS IN ITS LINE PATTERN

(75) Inventors: Michinobu Mizumura, Tokyo (JP); Mikio Hongo, Tokyo (JP); Masaaki Okunaka, Tokyo (JP); Kaoru Yamada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 42 days.

(21) Appl. No.: 09/944,866

(22) Filed: Aug. 31, 2001

(65) Prior Publication Data

US 2002/0180926 A1 Dec. 5, 2002

(30) Foreign Application Priority Data

Jun. 4, 2001 (JP) .......................................... 2001-167606

(51) Int. Cl.[7] .......................... G02F 1/1333; G02F 1/13; G02F 1/1343
(52) U.S. Cl. .......................... 349/54; 349/192; 349/139
(58) Field of Search .......................... 349/54, 192, 139

(56) References Cited

U.S. PATENT DOCUMENTS 5,303,074 A * 4/1994 Salisbury ...................... 349/55
5,801,965 A * 9/1998 Takagi et al. .................. 702/35
2001/0035920 A1 * 11/2001 Choi ............................ 349/54

FOREIGN PATENT DOCUMENTS

JP 363150675 A * 6/1988

* cited by examiner

Primary Examiner—Tarifur R. Chowdhury
Assistant Examiner—Hoan Chau Nguyen
(74) Attorney, Agent, or Firm—Townsend and Townsend and Crew LLP

(57) ABSTRACT

Shorting defects between the scan lines and signal lines are repaired during the manufacture of a TFT or other flat panel display unit without causing liquid crystal orientation defects and production yield is thereby improved. In a TFT panel in which scan line 2 bifurcates where scan line 2 and signal line 3 intersect, the lines having a protective insulation film 8 therebetween, one leg of the scan line 2 bifurcation is cut by a laser 9 where a short 7 has been found between lines at the intersection, thereby electrically separating the short. An insulation film material 13 dispensed from a glass pipette 12 is then applied locally to the cut part and surrounding area and cured to form a new insulation film.

6 Claims, 9 Drawing Sheets

12 : Glass pipette
13 : Insulating film material
13' : Insulating film material coating range Cross section along B-B'

Cross section along C-C'

17 : Foreign object
18 : Insulating film material

19 : Foreign object

1 : Glass substrate
2 : Scan line
3 : Signal line
4 : Pixel
6 : TFT structure
7 : Shorting defect portion 8 : Inter-layer insulating film
9 : Laser
10 : Dispersed metal
11, 11' : Portion severed by laser

FLAT PANEL DISPLAY UNIT AND METHOD OF REPAIRING DEFECTS IN ITS LINE PATTERN

BACKGROUND OF THE INVENTION

The present invention relates to a flat panel display unit such as a liquid crystal display panel, and to a method for repairing line patterns formed in the flat panel display unit.

Liquid crystal display (LCD) panels are used in personal computers and other types of office automation equipment, as well as in televisions and other audio/video (A/V) equipment. An LCD panel has pixel electrodes for driving the liquid crystals with an electric field; thin film transistors (TFT), whose number corresponds to the pixel count, for applying a voltage independently to each pixel electrode; a TFT panel on which orthogonal scan lines and signal lines are formed on a glass panel for controlling TFT switching; and a back panel comprising a color filter and back plane electrode opposing the TFT panel, with a specific gap therebetween in which the liquid crystals are filler.

As flat panel displays have become larger and display resolution has improved, the pixels have become smaller. This makes it increasingly difficult to manufacture defect-free products, and there is a need to increase manufacturing yield. A common conventional way of improving yield has been to repair panels determined to be defective.

Japanese Patent Laid-open Publication (kokai) H4-72552 describes a method for repairing line defects in a TFT panel manufacturing process where the circuit pattern is formed with the scan lines bifurcating the intersections of the scan lines and signal lines. When, during inspection, a short is detected at a scan-line-to-signal-line intersection prior to injecting the liquid crystals, a voltage is applied to each scan line and signal line and current flows to any short between the scan line and signal line. The defect can then be located by infrared inspection that looks for the heat produced by current at the short. The short is then electrically isolated by cutting that scan line with a YAG laser, for example, before and after the intersection with the signal line, leaving the other bifurcated scan lines uncut.

Japanese Patent Laid-open Publication (kokai) 184842/1996 describes a method of repairing a break in the wiring by coating the break with an organic solution dispensed with a glass pipette, then exposing the coated area to a laser to thermally break down the organic complex solution, deposit a metallic film, and thus form an electrical connection across the break.

With the conventional method of repairing shorting defects, the scan lines of the TFT panel bifurcate where the scan lines and signal lines intersect, the scan lines and signal lines having an interlayer insulation film therebetween, so that shorting defects can be repaired, and a short on either one of the legs can be repaired. As mentioned above, the intersecting scan line is cut with a YAG laser, for example, before and after the short at the intersection between a signal line and one of the two scan line legs, thereby electrically separating the shorting defect from the TFT circuit. Wiring material melted by the laser can, however, pass through the insulation film where the line is cut and scatter around the cut area. The protective insulation film can thus be lost around the cut, electrically exposing the scan line to the liquid crystal. As a result, there is insufficient insulation protection around the repair site, and leakage current can flow from the cut area. The liquid crystals vary with the type of product being produced, and, depending on the type of liquid crystal used, this leakage current can cause point defects in the liquid crystals, orientation defects in LCD alignment, and other problems.

Apart from the shorting defects, foreign objects adhering to the panel during the process forming the lines on the TFT panel can prevent normal formation of the insulation film that protects the lines. This results in defects that permit leakage current to flow from the insulation film defect to the liquid crystal. Depending upon the type of liquid crystal, this leakage current, too, can cause point defects in the liquid crystals, orientation defects, and other problems.

BRIEF SUMMARY OF THE INVENTION

To solve the problems described above, the present invention provides a flat panel display unit wherein interline shorting defects and line insulation defects caused by foreign matter adherence have been repaired without loss or malformation of the insulation film. The present invention further provides a flat panel display unit manufacturing method and apparatus for repairing interline shorting defects and/or line insulation defects caused by foreign matter adhering to a line.

More specifically, a method for repairing line defects according to the present invention detects a shorting defect between a scan line and signal line and identifies the location of the defect in a flat panel display unit wherein the scan lines, the signal lines, or both, branch in two parts at an intersection where the scan lines and signal lines are disposed with an interlayer of insulation film between the two parts. Once the defect is located, the intersection between the scan line and signal line where the short occurs is cut with a laser beam. An insulation film is then locally formed at the cut to complete the line defect repair.

The method for repairing line defects according to the present invention detects shorting defects between a scan line and signal line in a flat panel display unit having scan lines and signal lines formed with an interlayer insulation film therebetween, stores the location of the detected shorting defect, cuts the scan line by emitting a laser to the scan line near the location of the stored shorting defect, supplies an insulation material locally to the area containing the cut scan line, and then cures that insulation material.

These and other objects, features, and advantages of the invention will be apparent from the following detailed description of preferred embodiments of the invention taken in conjunction with the accompanying drawings.

DESCRIPTION OF THE PREFERRED EMBODIMENTS

The preferred embodiments of the present invention are described below with reference to the accompanying figures.

Embodiment 1

Figure 8:
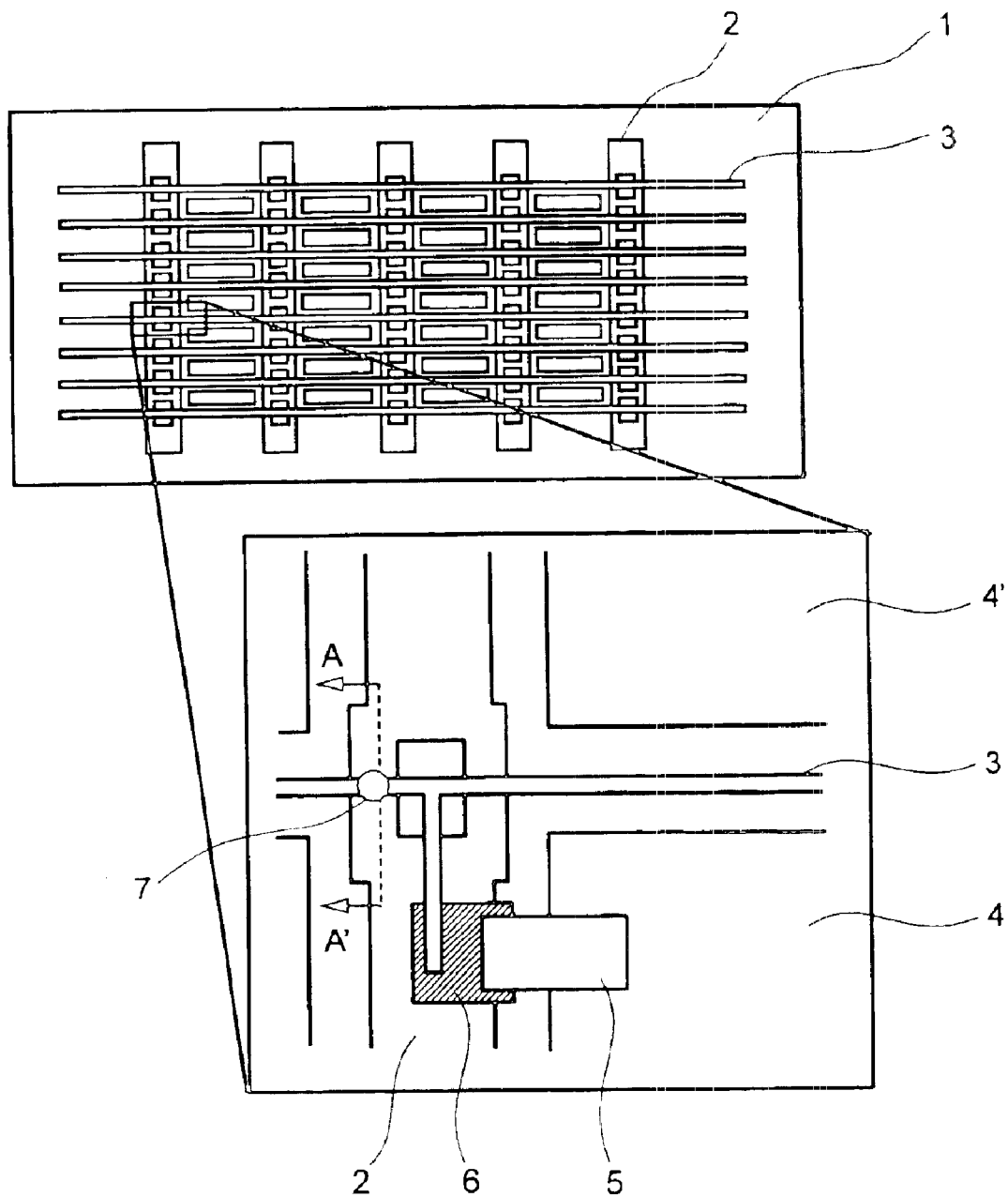
FIG. 8 is a simplified plan view of a typical TFT panel configuration.

A first preferred embodiment of the present invention is described below with reference to FIGS. 1, 2, 8,9, and 10. FIG. 8 is a simplified plan view of a typical TFT panel configuration. As shown in FIG. 8, a typical TFT panel has pixel electrodes 4, 4' on a glass panel 1 for changing the orientation of the liquid crystals by applying an electric field, and a TFT structure 6 formed for each pixel electrode 4 for applying a voltage to the corresponding pixel electrode 4. Plural scan lines 2 and signal lines 3 for driving each TFT according to an image signal are orthogonally disposed with an interlayer insulation film therebetween. In a VGA (Video Graphics Array) panel, for example, there are 1920 scan lines 2; there are 2400 in an SVGA (Super Video Graphics Array) panel; and there are more than 3000 in an XGA (Extended Graphics Array) panel. A protective insulation film is also formed covering the scan lines 2 and signal lines 3. Finally, an orientation film for aligning the orientation of the liquid crystals is formed, and a second panel forming a color filter, for example, is disposed opposite the TFT panel with the liquid crystals therebetween.

This first embodiment of the invention repairs a shorting defect 7 discovered in an inspection process that looks for shorting defects in the scan lines and signal lines after the lines on the TFT panel and the protective insulation film are formed. As described in the above-cited JP 72552/1992, the location of the scan line-to-signal line short is found by applying a voltage between each scan line and signal line. Compared with normal lines, a short shows excess current flow between the scan line and signal line, and this excess current produces heat from resistance where the lines short. The location of the short can then be identified by using an infrared detector to detect the infrared light produced by this heat. The location of the defect is then stored for use when repairing defects.

Figure 9:
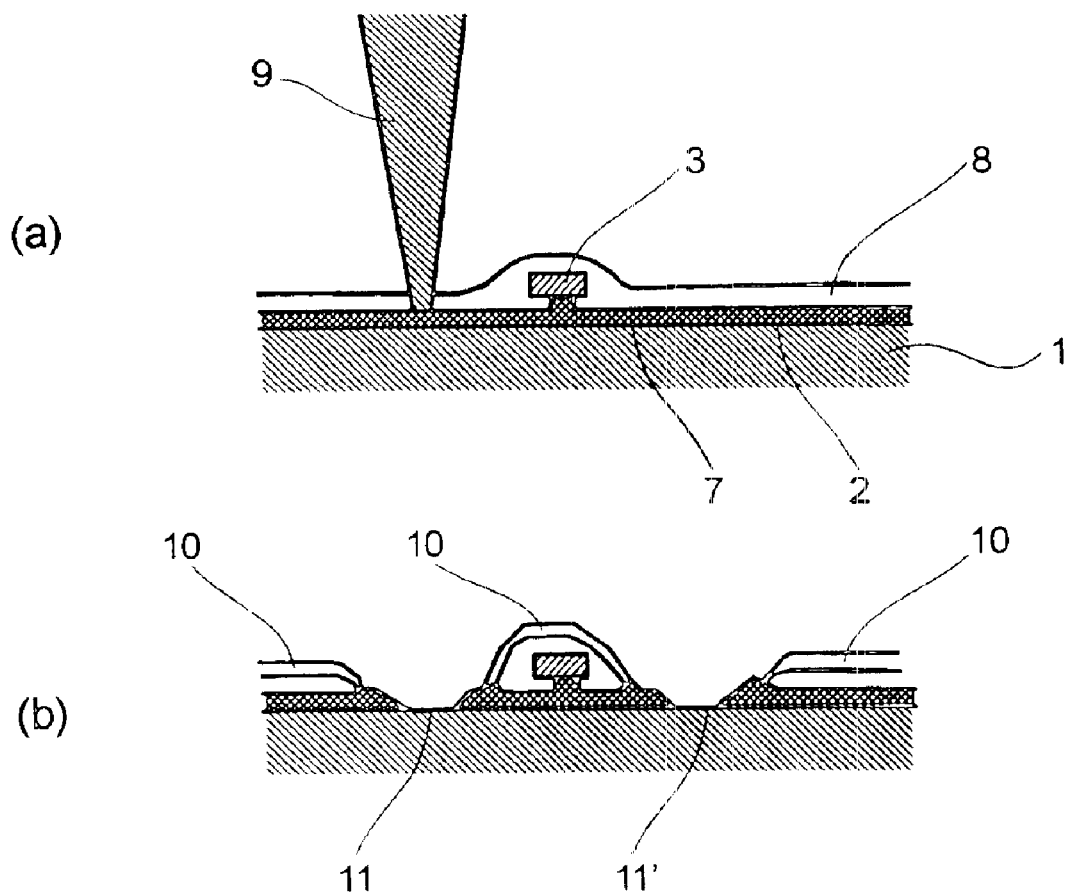
FIG. 9 is a section view of a TFT panel illustrating a method of repairing scan line and signal line shorting defects according to the prior art.

FIG. 9 is a section view at line A–A' through shorting defect 7 shown in FIG. 8. Signal line 3 and scan line 2 are electrically isolated by an interlayer insulation film (protective insulation film) 8 at the intersection between normal scan lines and signal lines. At a shorting defect 7 caused by foreign matter, for example, the insulation between the layers is deficient and the signal line 3 and scan line 2 short at the crossover. With a circuit pattern allowing repair of such shorts according to the prior art, the scan line bifurcates at this intersection and thus intersects with the signal line at two points.

Repairing the shorting defect is not possible when both of these intersections short at the same time. However, when there is a short at only one of the intersections, the scan line is cut with a laser 9 before and after the intersection at laser cuts 11 and 11' as shown in FIG. 9 (a). The shorting defect 7 is thus repaired by electrically separating shorting defect 7 from scan line 2. With this method, however, laser 9 also removes part of the protective insulation film 8 above laser cuts 11 and 11', thereby electrically exposing part of the scan line 2 to the liquid crystal, as shown in FIG. 9 (b).

Figure 10:
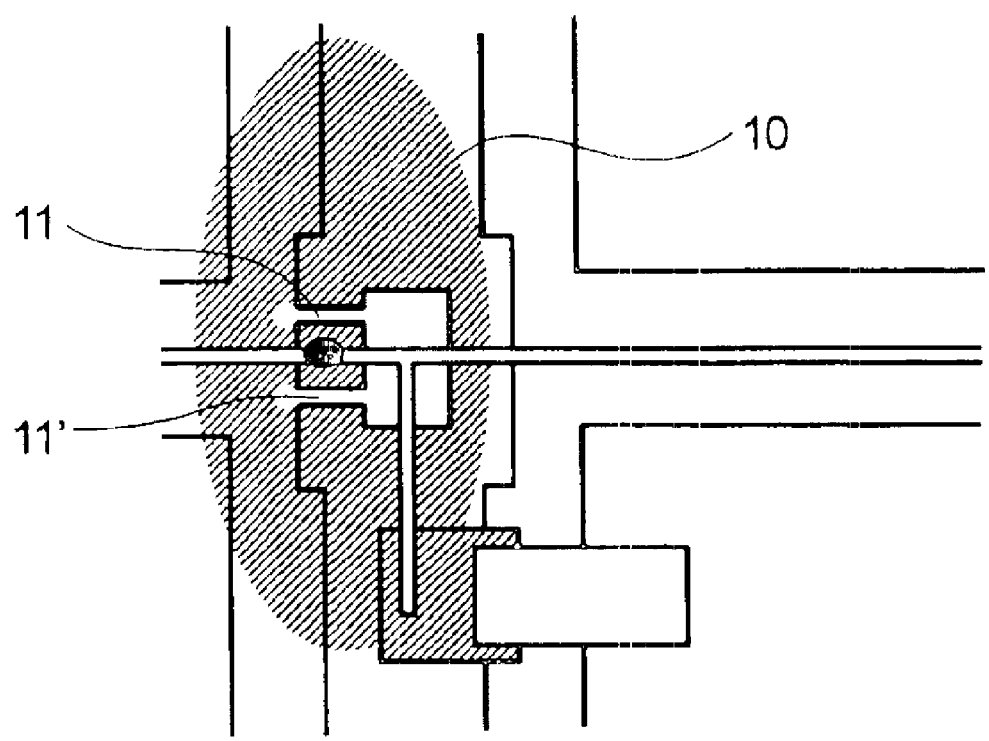
FIG. 10 is a section view of a TFT panel illustrating a method of repairing scan line and signal line shorting defects according to the prior art.

As also shown in FIG. 10, laser 9 melts and removes metal 10 from scan line 2. Metal 10 scatters and typically lands in a 100 μm to 200 μm diameter area around laser cuts 11 and 11'.

The short is apparently electrically repaired and the defect resolved at this point. However, when the LCD pap-el is confirmed as a defect-free unit and power is supplied to the panel, an electric field leaks from scan line 2 into the liquid crystals. Depending upon the type of liquid crystal used, this leakage current causes a crystal orientation defect apparent as a point defect.

Figure 1:
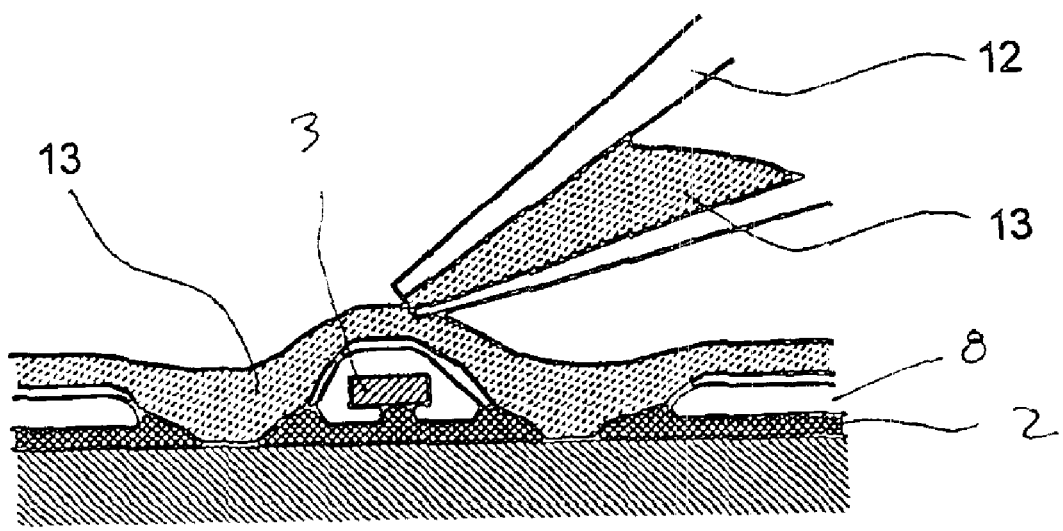
FIG. 1 is a section view of a glass pipette and TFT panel illustrating the repair method of a first preferred embodiment of the present invention.
Figure 2:
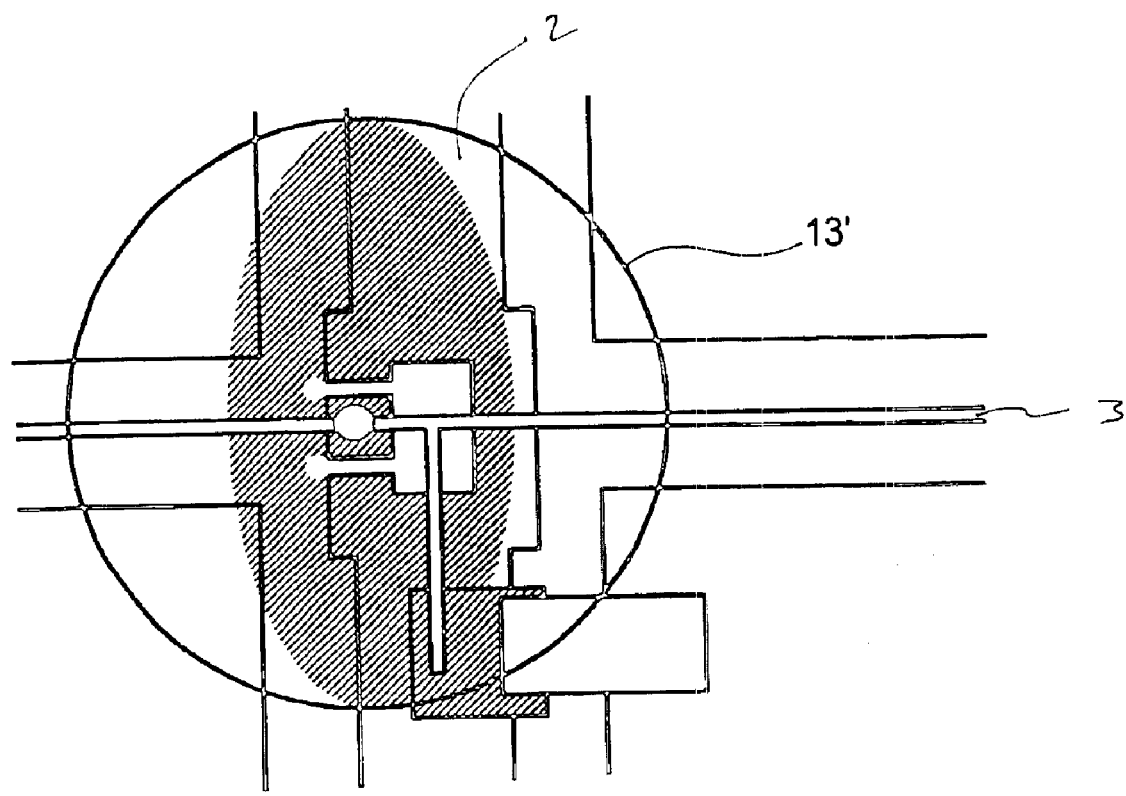
FIG. 2 is a plan view of a TFT panel showing the area where insulation material is coated in a first preferred embodiment of the present invention.

The present invention solves this problem as described next with reference to FIG. 1. After laser 9 severs scan line 2 at laser cuts 11 and 11', an insulation film material is locally applied to a 100 μm to 200 μm diameter area around the laser cuts to protect the cuts and to cover scattered metal 10.

This insulation material can be locally applied by dispensing insulation film material 13 from a glass pipette 12 having a tip diameter of several microns, using capillary action as taught in JP 184842/1996. Filled with insulation film material 13, glass pipette 12 is mounted to the arm of a manipulator (not shown in the figure) that can be controlled and positioned to the TFT panel with micron-order precision.

A gas tube is connected to the other end of the glass pipette 12. The gas tube is connected to a gas supply system (not shown) for supplying air or inert gas by means of a solenoid that operates with pulses variable from I ms to multiple seconds.

A horizontally movable stage (not shown) on which the TFT panel is mounted and the above-noted manipulator, which can move glass pipette 12 both horizontally and perpendicularly to the TFT panel are used. Glass pipette 12 is moved in an area 100 μm to 200 μm around the shorting defect, based on the infrared-derived short location information, to contact the TFT panel surface at shorting defect 7 while the area to be coated is viewed through an optical microscope.

Air or inert gas is then flowed into glass pipette 12 by the gas supply system for 1 ms to plural seconds at several tens of kilopascals, to spray the insulation material while controlling the coating area to locally coat insulation film material 13 on a 100 μm to 200 μm diameter area.

The applied insulation film material 13 may be, for example, a SiOx resin, polyimide resin, epoxy resin, or acrylic resin material. The specific curing method will depend on the characteristics of insulation film material 13. A polyimide resin material, for example, can typically be cured by a chemical reaction induced by heating the TFT panel or coated area for a specific time to form the insulation film. The TFT panel can be heated by holding the panel in an oven held at a constant temperature for a specific time, or heat can be applied locally to the coated area using a heat lamp. Curing assures that the repaired site is also electrically isolated from the liquid crystals even after the LCD panel is completed, thereby enabling a shorting defect 7 to be repaired without producing point defects or other orientation defects.

Embodiment 2

When a shorting defect is repaired as described in the first embodiment above, the size of the area on the TFT panel to which the molten scan line metal 10 scatters when laser 9 removes the scan line is before and after the shorted intersection depends on the characteristics of the laser, but is typically 100 μm to 200 μm in diameter. As shown in FIG. 1, this 100 μm to 200 μm diameter area is coated with an insulation film material 13 using a glass pipette 12, and the insulation film material 13 is heat cured, for example, to form an insulation film over the repair site. The thickness of this locally formed insulation film is 0.3 μm to 1 μm, producing a thicker film portion relative to the unrepaired surrounding at the repair site.

A problem arises with this repair process in relation to the orientation film that is formed over the entire TFT panel before injecting the liquid crystals. This orientation film is designed to align the liquid crystals in the same direction. The thicker insulation film portion formed at the repair site, however, interferes with the desired liquid crystal orientation. In a high resolution TFT panel the pixel electrodes as well as the gaps between electrodes are short, and disruption of the liquid crystals in a repair site extending in a 100 μm to 200 μm diameter area can extend to multiple pixel electrodes outside the immediate repair site. In a worst case scenario the repair site is visible to the unaided eye, and will be determined defective upon inspection.

The repair method of the second embodiment of this invention solves this problem by suppressing such defects in high resolution TFT panels and other products having a short pixel-electrode gap, and by repairing defects that do occur. This second embodiment of the invention is described next with reference to FIG. 3 and FIG. 4.

Figure 3:
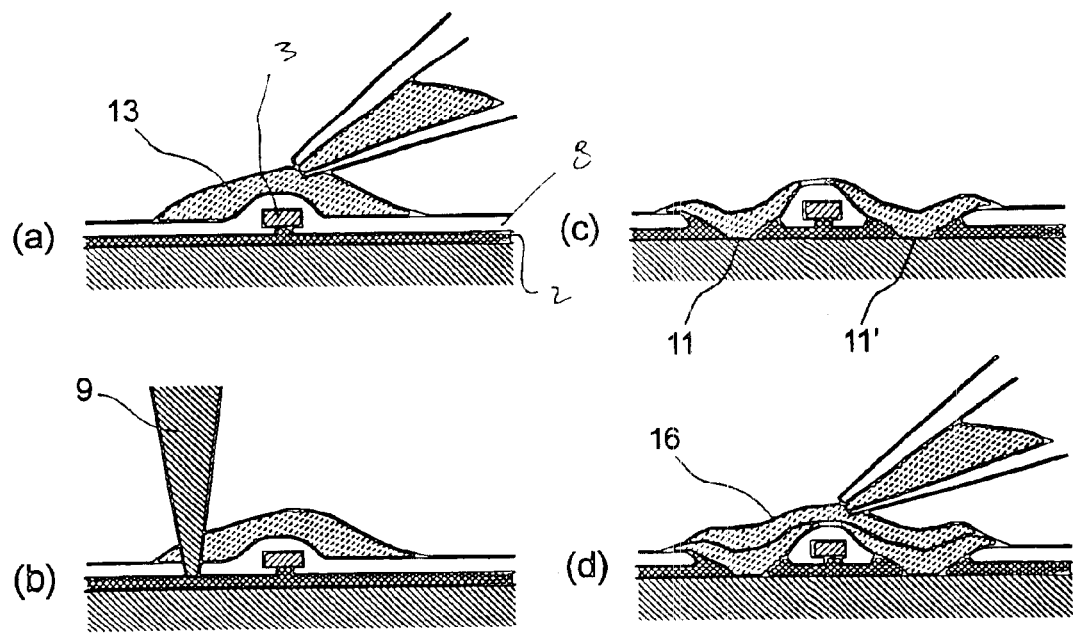
FIG. 3 is a section view of a glass pipette and TFT panel illustrating the repair method of a second preferred embodiment of the present invention.

Referring to FIG. 3 (a), a horizontally movable stage (not shown) on which the TFT panel is mounted and the above-noted manipulator, which can move the glass pipette 12 both horizontally and perpendicularly to the TFT panel are used. Glass pipette 12 is moved in an area 100 μm to 200 μm around the shorting defect based on the infrared-derived short location information, and the pipette is put in contact with the TFT panel surface at shorting defect 7 while the area to be coated is viewed through an optical microscope.

Air or inert gas is then flowed into glass pipette 12 by the gas supply system for 1 ms to plural seconds at several tens of kilopascals, to spray the insulation material while controlling the coating area to locally coat insulation film material 13. The coating area 15 can be freely determined to be an area that will not produce defects caused by the repair, this area calculated based on the pixel-electrode gap of the specific TFT panel.

After the coating process, glass pipette 12 is retracted by the manipulator to a site where it will not contact laser 9. One side of scan line 2, which bifurcates at the intersection of shorting defect 7, is then cut by laser 9 at laser cuts 11 and 11', as shown in FIG. 3 (b). In this case, however, the molten metal from scan line 2 produced during cutting by laser 9 is trapped inside insulation film material 13, which has not been heat cured and thus remains a high-viscosity fluid. The molten metal thus remains in the insulation film material and does not scatter outside the area of coated insulation film material 13.

Figure 4:
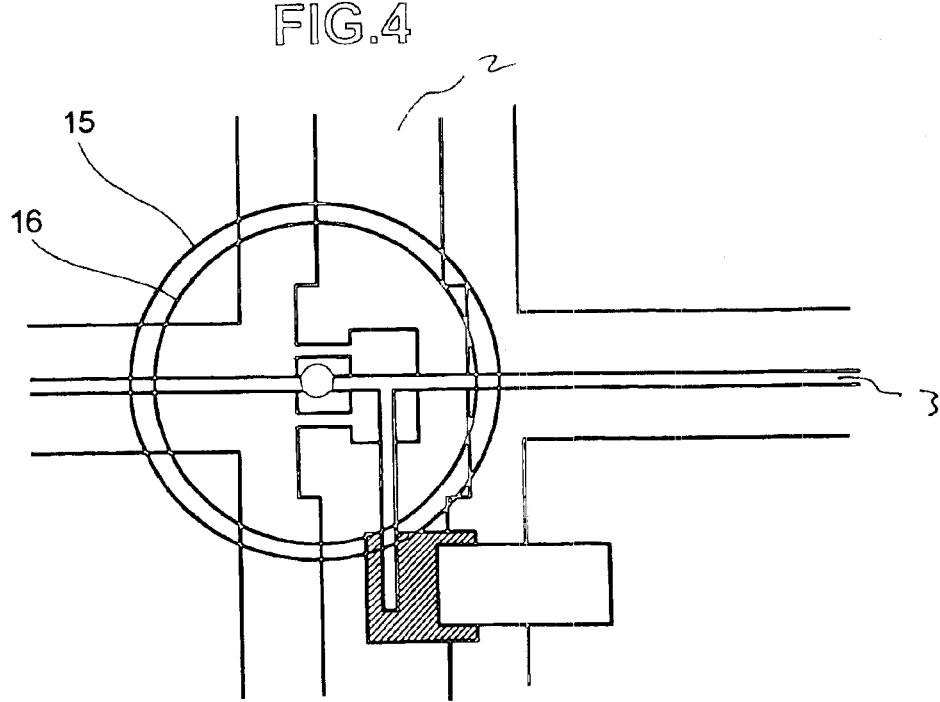
FIG. 4 is a plan view of a TFT panel showing the area where insulation material is coated in a second preferred embodiment of the present invention.

By thus limiting the area of scattered metal within coating area 15 of insulation film material 13, repairs can be made in an area without causing orientation defects. As shown in FIG. 3 (c), because the thickness of insulation film material 13 is thinner where the line was cut by laser 9, insulation material 13 is reapplied by glass pipette 12 in coating area 16 to increase the thickness of the insulation material, as shown in FIG. 3 (d). It should be noted that coating area 16 is inside the boundaries of the first coating area 15, as shown in FIG. 4.

Insulation film material 13 is then cured with a curing method determined by the characteristics of the insulation film material to form an insulation film.

As a result, the repair site is also electrically isolated from the liquid crystals in the completed LCD panel unit. A shorting defect 7 can therefore be repaired without the repair creating a point defect or other orientation defect even in high-resolution TFT panels where the pixel electrodes and pixel-electrode gaps are short.

It will also be apparent that because the area in which the molten scan line 2 metal scatters is suppressed by this second embodiment of the invention, the coating area to which insulation film material 13 is applied can be restricted to scan line 2 and the adjacent area, and repair is possible without affecting the surrounding pixel electrodes.

Embodiment 3

Figure 5:
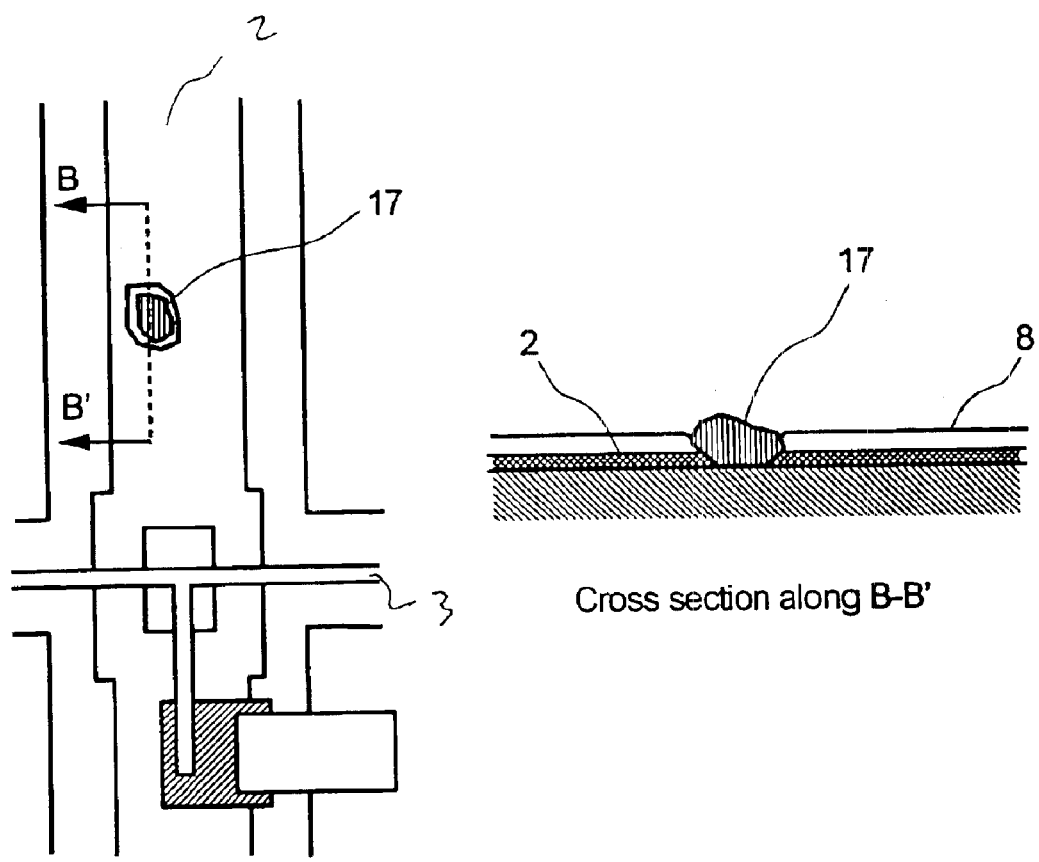
FIG. 5 is a plan view and partial section view of a TFT panel showing adhesion of foreign matter leading to a defect in a third preferred embodiment of the present invention.
Figure 6:
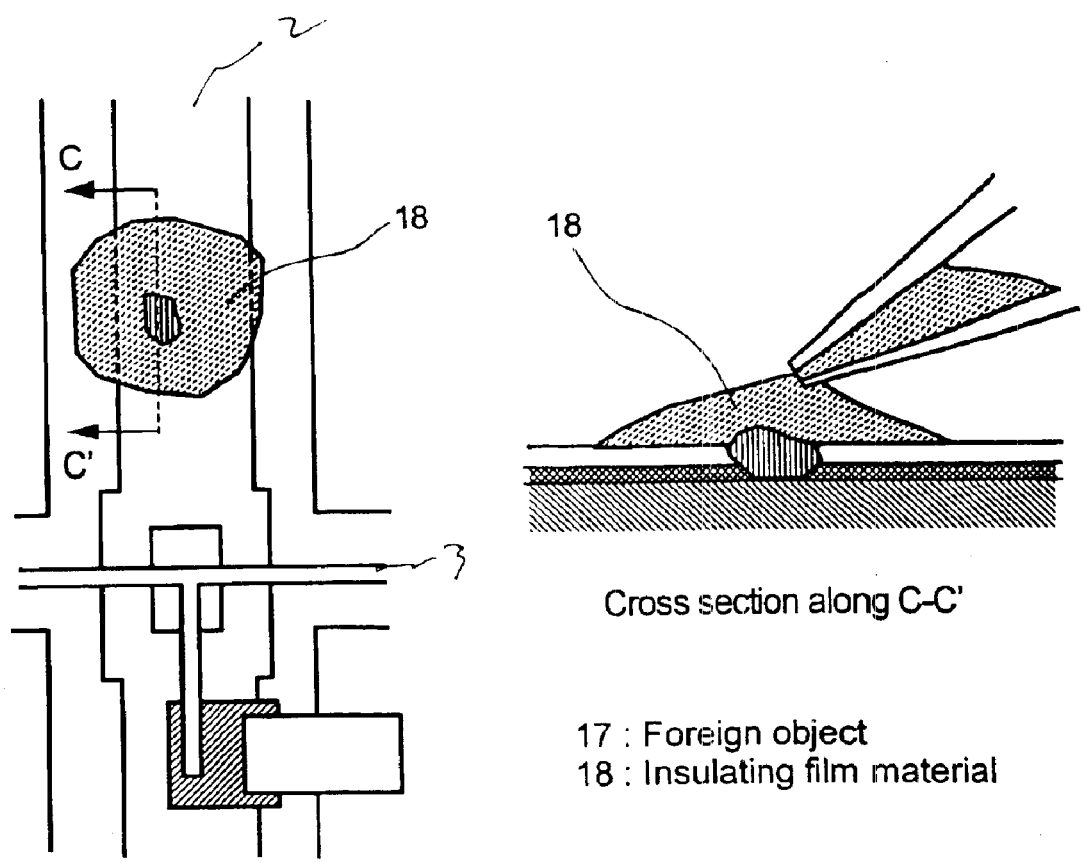
FIG. 6 is a plan view and partial section view of a TFT panel showing a repair method according to a third preferred embodiment of the present invention.

A third preferred embodiment of the present invention is described next with reference to FIGS. 5 and 6. FIG. 5 shows a TFT panel after the protective insulation film is formed. In this case, however, foreign matter 17 adheres to scan line 2 during the line formation process, and as shown in the B–B' section view through the foreign matter 17, the foreign matter on scan line 2 obtrudes through protective insulation film 8. When this happens, an electric field from scan line 2 will leak into the liquid crystals from around the foreign matter 17 when current is supplied to the finished LCD panel, whether the foreign matter 17 is a dielectric or a conductor, possibly resulting in point defects or other orientation defects, depending on the type of liquid crystal.

To prevent such defects it is first necessary to inspect for foreign matter in the TFT panel inspection process following insulation film formation, and to identify the location of any foreign matter 17 that could lead to such orientation defects. The defect is then repaired using the process described above in either the first or second embodiment.

This repair is now described with reference to FIG. 6. As in the first or second embodiment, this process uses a horizontally movable stage (not shown) on which the TFT panel is mounted, and the above-noted manipulator, which can move glass pipette 12 both horizontally and perpendicularly to the TFT panel. Glass pipette 12 is moved within 100 μm to 200 μm of the foreign matter 17 to be repaired on the TFT panel, based on the location of the foreign matter identified in the inspection process and then glass pipette 12 is brought in contact with the TFT panel surface at foreign matter 17 while the area to be coated is viewed through an optical microscope.

Air or inert gas is then flowed into glass pipette 12 by the gas supply system for I ms to plural seconds at several tens of kilopascals to spray the insulation material while controlling the coating area, and foreign matter 17 is coated with the insulation material 18 in glass pipette 12. As shown in the section view through line C–C' in FIG. 6, foreign matter 17 is completely covered with insulation material 18.

Insulation material 18, which can be any of the insulation materials described in the first and second embodiment, is then cured by heat curing or by another process determined by the characteristics of insulation material 18 to form the insulation film. The repair site is thus insulated from the liquid crystals in the completed LCD panel, and point defects or other orientation defects caused by foreign matter 17 can be suppressed.

Embodiment 4

A fourth embodiment of the present invention is described next with reference to FIG. 7. The third embodiment above describes a method of suppressing point defects resulting from foreign matter, but the described method can be used only when the distance d from the TFT panel surface to the top of the foreign object is less than or equal to the distance D between the TFT panel surface and the opposing color filter panel so that there is no contact with the opposing color filter panel on the other side of the liquid crystals.

Figure 7:
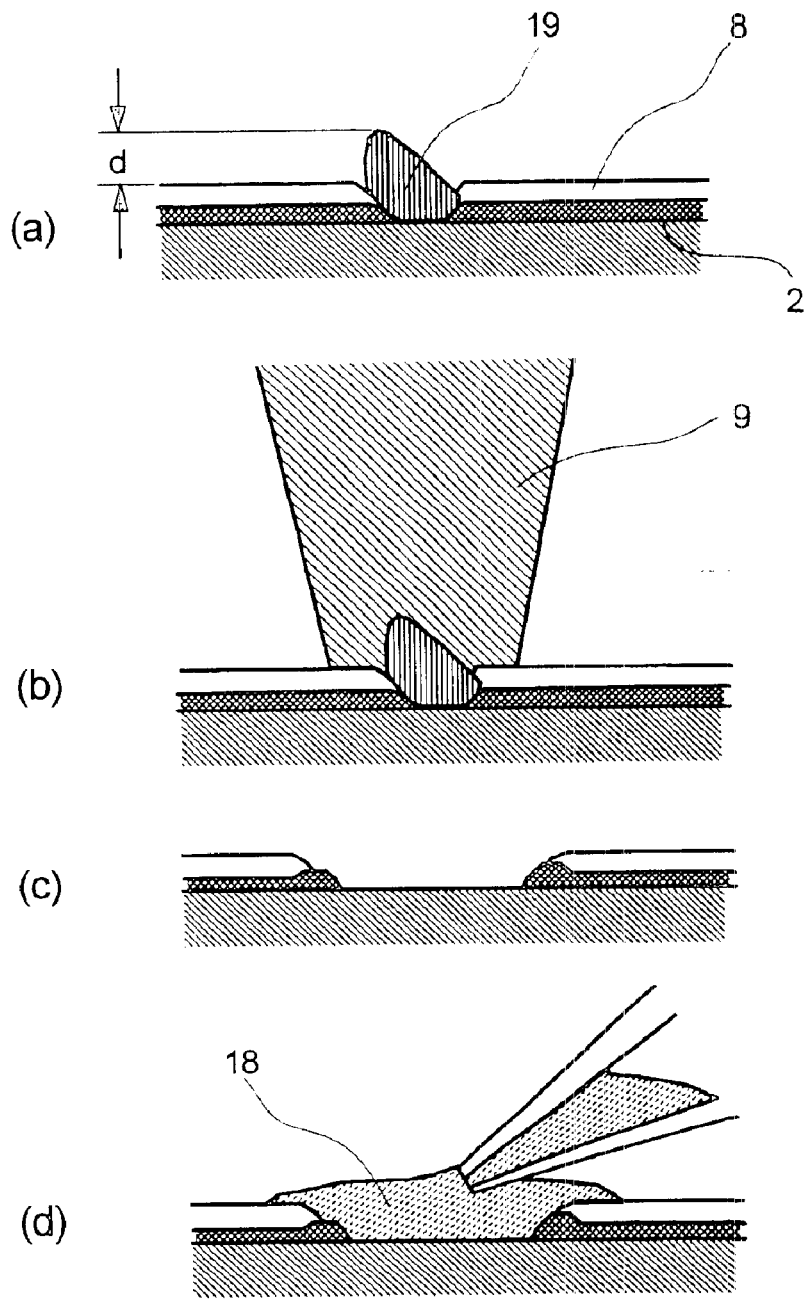
FIG. 7 is a section view of a glass pipette and TFT panel illustrating the repair method of a fourth preferred embodiment of the present invention.

When d >D and there is a danger that foreign object 19 will contact the opposing panel as shown in FIG. 7 (a), laser 9 is positioned and emitted to the area containing the foreign object 19, based on the detected location of the foreign object, using a horizontally movable stage (not shown) on which the TFT panel is mounted, in order to remove the foreign object 19, adjacent scan line 2 and protective insulation film 8. It should be noted that while the size and shape of the foreign object 19 are variable, the cross section of the laser 9 cannot be shaped to a desired form. The laser 9 cross section must therefore be a beam that is larger than the foreign object 19. This assures that scan line 2 and protective insulation film 8 around foreign object 19 will be simultaneously removed.

As shown in FIG. 7 (c), this process removes foreign object 19 and assures there will be no contact with the other panel. As described above in the first to third embodiments, glass pipette 12 is moved using a horizontally movable stage (not shown) on which the TFT panel is mounted and the above-noted manipulator, which can move the glass pipette 12 both horizontally and perpendicularly to the TFT panel. Based on the detected location information, the glass pipette 12 is positioned within 100 μm to 200 μm of the repair site on the TFT panel where foreign object 19 was removed by the laser, and is then brought in contact with the TFT panel surface where foreign object 19 was removed, while the area to be coated is viewed through an optical microscope.

Air or inert gas is then flowed into glass pipette 12 by the gas supply system for I ms to multiple seconds at several tens of kilopascals to spray the insulation material while controlling the coating area, and the repair site is coated with the insulation material 18 in glass pipette 12. The scan line 2 exposed portions in the processed area are completely covered by insulation material 18. Furthermore, as in the first to third embodiments, the applied insulation material 18 is cured by a heat process or other process appropriate to the characteristics of the insulation material to form an insulation film.

As a result of this process even large foreign objects that would contact the opposite panel can be removed and the panel repaired. The repair site is therefore insulated from the liquid crystals even in the completed TFT panel, and point defects caused by such a foreign object 19 can be prevented.

It will thus be obvious to one with ordinary skill in the art that shorting defects between a scan line and signal line occurring in the manufacture of a flat display panel unit can be reliably repaired. As a result, production yield of flat panel display units can be improved.

It is also possible to prevent point defects and other orientation defects caused by foreign matter. As a result, production yield of flat panel display units can be further improved.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A method for repairing line defects in a flat panel display having a branch of at least a scan line or a signal line at an intersectional region between the scan line and the signal line, the method comprising:

detecting a shorting defect between a scan line and signal line disposed with an interlayer insulation film therebetween and identifying the location of the shorting defect, forming an organic insulating layer to cover the intersectional region with a shorting defect locally; and cutting the branch at two regions as to sandwich the shorting defect using a laser beam before curing the organic insulation film.

2. A method for repairing line defects as described in claim 1, wherein the flat panel display unit is a liquid crystal display panel.

3. A method for repairing line defects as described in claim 1, wherein the organic insulation film includes a material selected from the group consisting of silicon oxide resin, polyimide resin, epoxy resin, and acrylic resin.

4. A method for repairing line defects as described in claim 1, further comprising forming an organic insulation film on to the repaired portion.

5. A method for repairing line defects in a flat panel display having a branch of a scan line at an intersectional region between the scan line and a signal line, the method comprising:

detecting a shorting defect between a scan line and the signal line disposed with an interlayer insulation film therebetween;

storing the position of the detected shorting defect;

supplying an organic insulating material to cover the intersectional region with a shorting defect locally;

severing the scan line at two regions near the stored position of the shorting defect with a laser beam before curing the organic insulation material; and forming an organic insulation film on to the repaired portion.

6. A method for repairing line defects as described in claim 5, in which a shorting defect between the scan line and the signal line is detected by applying a voltage between the scan line and the signal line and then detecting an infrared signal being produced at the position of the shorting defect using an infrared detector.

* * * * *